United States Patent [19]

Chappell

[11] Patent Number: 4,693,700
[45] Date of Patent: Sep. 15, 1987

[54] DERAILLEUR SHIFTER

[76] Inventor: Gilmore H. Chappell, 6147 Christian St., Philadelphia, Pa. 19143

[21] Appl. No.: 883,147

[22] Filed: Jul. 8, 1986

Related U.S. Application Data

[63] Continuation-in-part of Ser. No. 707,960, Mar. 4, 1985, Pat. No. 4,599,079.

[51] Int. Cl.$^4$ ............................................. F16H 9/24
[52] U.S. Cl. ..................................................... 474/80
[58] Field of Search .................................. 474/78–82, 474/101, 113, 116–119, 140, 144

[56] References Cited

U.S. PATENT DOCUMENTS

| | | | |
|---|---|---|---|
| 3,121,575 | 2/1964 | Bourgi | 474/80 X |
| 3,613,466 | 10/1971 | Houghton | 474/80 |
| 3,769,848 | 11/1973 | McGuire | 474/80 |
| 3,929,025 | 12/1975 | Perry | 474/70 |
| 4,061,046 | 12/1977 | Lang | 474/80 X |
| 4,343,613 | 8/1982 | Leiter et al. | 474/80 X |
| 4,395,251 | 7/1983 | King et al. | 474/140 X |
| 4,599,079 | 7/1986 | Chappell | 474/82 X |

FOREIGN PATENT DOCUMENTS

| | | | |
|---|---|---|---|
| 0830162 | 7/1938 | France | 474/80 |
| 0086100 | 4/1936 | Sweden | 474/80 |

Primary Examiner—Stephen J. Novosad
Assistant Examiner—Thuy M. Bui
Attorney, Agent, or Firm—Steele, Gould & Fried

[57] ABSTRACT

An improved derailleur shifter is disclosed which includes a pivot arm secured to the frame of the bicycle in a stationary relationship, a shifter arm pivotally secured to the pivot arm in a manner to rotatively move relative to the frame, a chain slide attached to the shifter arm in a rotative and angularly adjustable engagement, a spring biasing between the pivot arm and the shifter arm to continuously urge the chain slide against the upper run of the bicycle chain to depress the chain; a stabilizer interconnected between the pivot arm and the shifter arm in a manner to allow substantially unrestricted counter-clockwise pivotal movement of the shifter arm relative to the pivot arm and to restrict clockwise pivotal movement of the shifter arm relative to the pivot arm, and a flexible cable interconnecting the shifter arm with the derailleur whereby the derailleur will be automatically operated to index the chain across the small diameter cluster gears in response to pivotal movement of the shifter arm as caused by interaction of the bicycle chain and the chain follower upon changes in stress in the bicycle chain.

16 Claims, 6 Drawing Figures

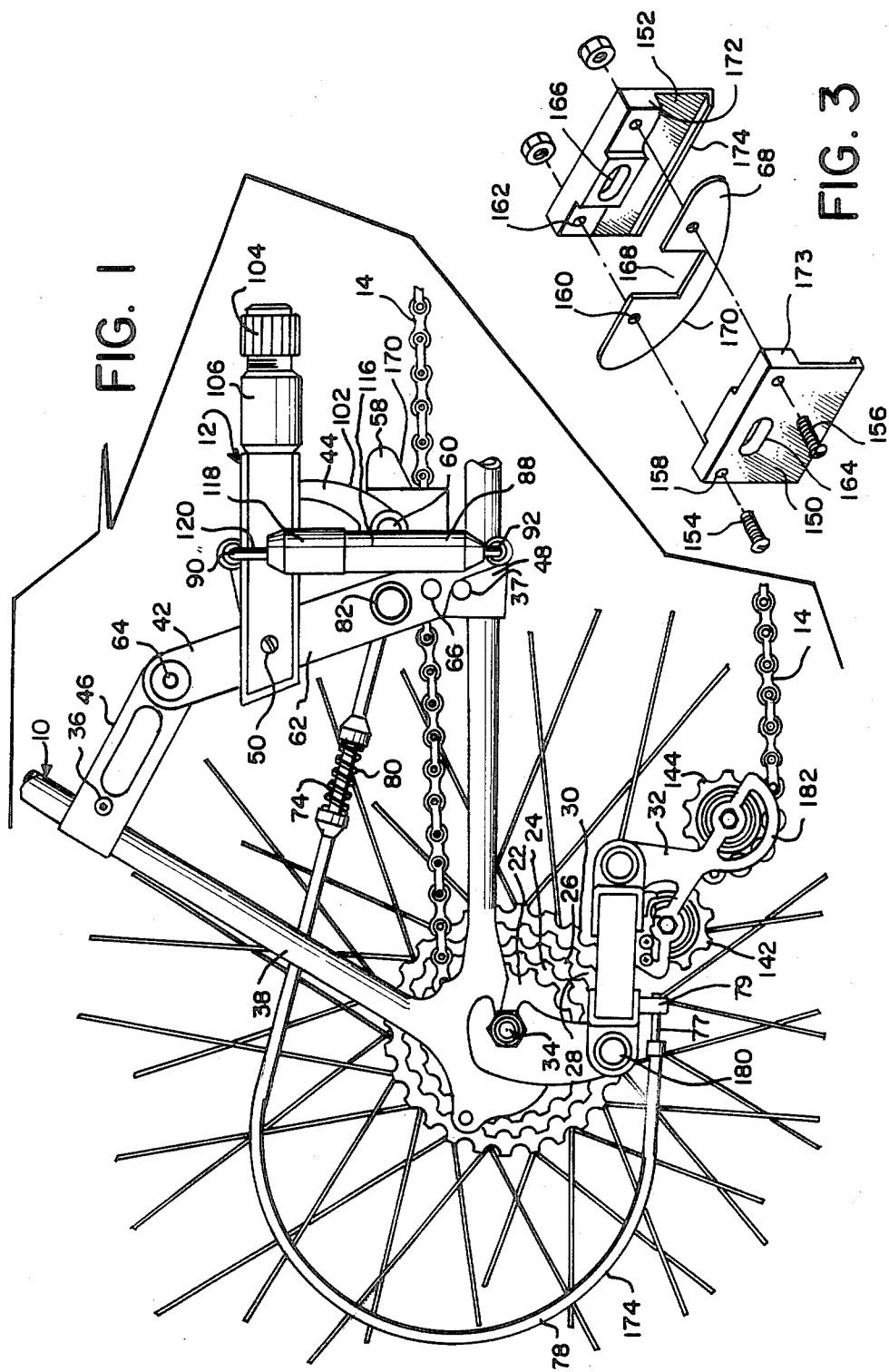

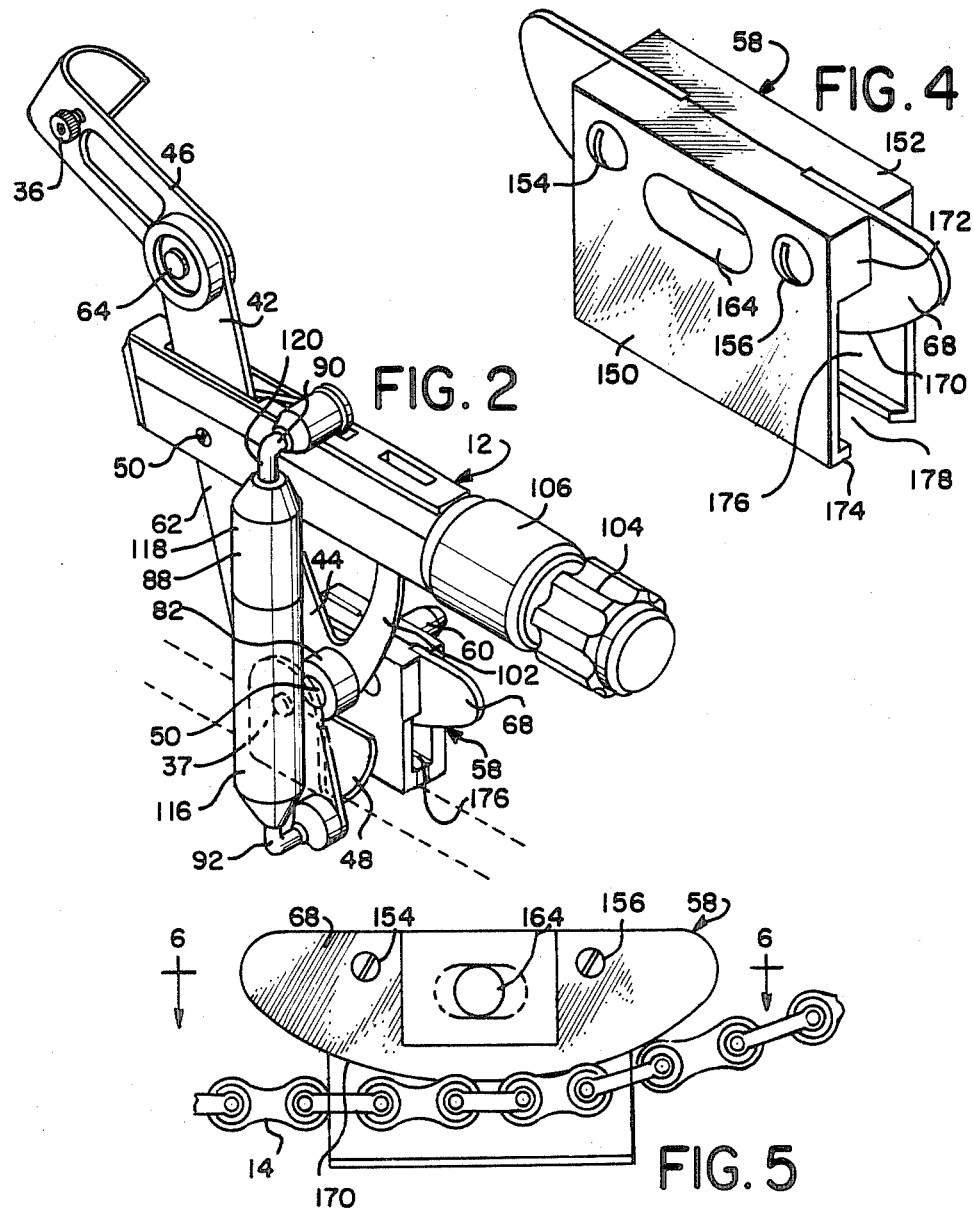
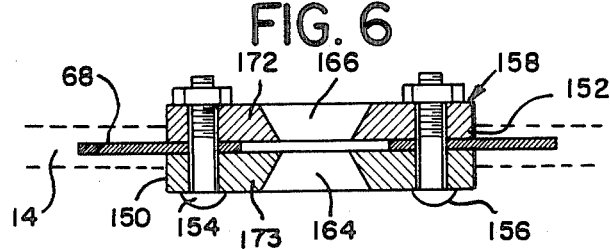

DERAILLEUR SHIFTER

RELATED INVENTION

This application is a continuation-in-part of my co-pending application Ser. No. 707,960, filed Mar. 4, 1985, entitled "Automatic Derailleur Shifter", now U.S. Pat. No. 4,599,079.

BACKGROUND OF THE INVENTION

1. Field of the Invention

The present invention relates generally to the field of bicycle transmissions, and more particularly, relates to an improved automatic derailleur shifter wherein the gear ratio between the driving and driven gears can be automatically varied in response to the power requirements.

2. Description of the Prior Art

Bicycle transmissions wherein the gear ratio can be automatically varied through a contractible and expandable, large diameter sprocket wheel construction in response to the effort exerted upon the pedals by the cyclist are known. In these types of devices which have been developed for use with the so-called five speed and ten speed transmissions, the effective diameter of the driving, large diameter sprocket wheel assembly has been varied by providing a plurality of cooperating sprocket gears and by changing the radial positions of the sprocket gears. The determination of the radial positions of the sprocket gears is an automatic function of the input torque and the parts are so arranged that by increasing the torque, the effective diameter of the sprocket wheel components will be decreased against the bias of an operating spring or springs. Conversely, by decreasing the input torque applied at the pedals, the continuously acting spring or springs function to automatically increase the effective diameter of the sprocket gears. In this manner, the gear ratio between the driving gears and the driven gears has been effectively automatically varied.

In the variable large diameter sprocket wheel types of transmissions, it was the usual practice to disconnect and remove the rear derailleur together with its control cable and lever and to permanently place the drive chain about one of the rear small cluster gears. Accordingly, all changes in the respective gear ratios of the bicycle transmissions were accomplished by changing the effective diameter of the large driving gear. However, all of these types of prior automatic transmissions suffered from a common problem in that the increase or decrease in the effective diameter of the sprocket wheel assembly could not be smoothly made and the engagement or disengagement of the driving sprockets and the driving chain was always accompanied by an unwanted and uncontrollable clatter or shock, a condition which is definitely detrimental when operating any bicycle transmission, and is especially so under racing conditions. Additionally, most of the prior designs tended to be cumbersome, complicated and somewhat ungainly in appearance.

Other prior workers in the art have attempted to improve the manner of varying the gear ratio by applying special constructions at or about the cluster gears to function the derailleur for gear change purposes. Some of the prior art constructions included electrical changers, pneumatic changers and other mechanical devices which were intended to remotely operate the derailleur. So far as is known, most or all of the prior art gear changing devices required conscious effort on the part of the bicycle rider in order to effect the desired gear change.

The prior art automatic gear ratio changing constructions have tended to be quite complicated and cumbersome in design, thereby resulting in increased manufacturing costs, in increased maintenance costs, in increased weight and in a plurality of interacting components that were continually subject to breakdown or wear. Accordingly, the need remains to provide a simple, lightweight and automatically operating mechanism that is designed to easily change the gear ratio of a bicycle transmission in a smooth manner without conscious effort on the part of the rider.

SUMMARY OF THE INVENTION

The present invention relates generally to the field of automatic bicycle transmissions, and more particularly, is directed to an improved gear ratio changing assembly featuring a derailleur shifting mechanism that is responsive to the input torque upon the drive chain to automatically shift the chain to the proper sized cluster gear for optimum operating efficiency over a varying terrain.

The present invention is adaptable for use with substantially all bicycles of the five speed, ten speed and twelve speed type both as original equipment when installed by the bicycle manufacturer at the time of bicycle assembly and as a retrofit by either the bicycle owner or by a bicycle shop in the case of used bicycles.

The automatic derailleur shifter of the present invention comprises a minimum of interacting parts and includes generally a first, frame connected arm which is fixed in position and which is attachable to the bicycle frame in a simple, sturdy manner in the vicinity of the rear axle. A movable shifter arm is pivotally interconnected to the frame connected arm and is arranged for pivotal movement thereabout. The movable shifter arm rotatively carries a chain slider or follower for imput torque sensing purposes. The follower is so installed as to continuously press downwardly upon the upper run of the bicycle chain and, when the chain is unstressed, to depress the chain upper run sufficiently to establish an initial position. In the initial position, it is intended that the bicycle chain will be indexed across the cluster gears by the derailleur to a position wherein the chain will be engaged by the smallest of the cluster gears, thereby providing the maximum gear ratio capability of the system.

A short flexible cable is interconnected between a portion of the movable shifter arm and the cable connector of a conventional derailleur and the cable is adjusted to urge the derailleur to position the bicycle chain upon the smallest of the cluster gears when the chain is unstressed and the movable shifter arm is pivoted to its initial position. An automatic shifter spring is interconnected between a portion of the frame connected arm and a portion of the movable shifter arm to continuously bias the movable shifter arm and the chain follower towards the initial, chain depressing position. A hydraulic or other type of cylinder or other suitable movement stabilizing means is also interconnected between the fixed arm and the movable shifter arm to control and slow the pivotal movement of the movable shifter arm toward the initial position in the clockwise direction. The stabilizing means has surprisingly been found to permit smooth, automatic functioning of the device with substantially all popular types of existing derailleurs.

When stress is imposed upon the bicycle chain, for example, when bicycling up an incline or hill, the additional torque that must be applied to the pedals will act to additionally tension the chain and tend to straighten the upper run of the chain by reducing the amount of chain depression imposed by the chain slider. The straightening of the bicycle chain upper run will force the chain slider or follower upwardly against the bias of the automatic shifter spring, thereby causing the roller attached movable shifter arm to rotate in a counter-clockwise direction relative to the fixed arm. It is noteworthy that the counter-clockwise rotation of the movable shifter arm will be completely unopposed by the hydraulic cylinder or stabilizing means.

The geometry of the system is so designed that the counter-clockwise rotation of the movable shifter arm as caused by increased torque upon the pedals will impose pulling forces on the short flexible cable to thereby cause the pantographic linkage of the derailleur to urge its chain shifting wheel or sprocket transversely inwardly toward the larger of the cluster gears. As the hill or incline becomes steeper, additional torque must be applied at the pedals by the rider to continue upwardly, thereby increasingly tending to linearly straighten the upper run of the bicycle chain. Additional upper run chain straightening will result in further indexing the derailleur across the cluster gears until the bicycle chain is shifted to the largest of the small cluster gears. In this position, the maximum mechanical advantage of the multi-speed bicycle transmission will have been automatically reached, all without conscious effort on the part of the rider.

When the incline has been successfully traversed and the rider begins to descend, maximum torque will no longer be required upon the pedals and the bicycle chain will no longer be stressed to its maximum. Under these conditions, the automatic shifter spring will tend to overcome the torque or stresses in the bicycle chain and will begin to depress the upper run of the chain. This depression in turn will cause rotation of the movable shifter arm in a clockwise direction as the follower increasingly tends to depress the upper run of the chain. Depression of the upper run of the chain will cause clockwise rotation of the movable shifter arm relative to the fixed arm and will unstress the short flexible cable by pushing the flexible cable toward the derailleur. The unstressed flexible cable will then allow the existing derailleur spring to function the pantograph linkage in the usual manner to cause the chain shifting sprocket to index the chain transversely across the cluster gears until the chain is properly positioned upon the smallest of the cluster gears. In this position, the maximum speed gear ratio of the transmission design will have been reached.

It will be appreciated that the arrangement of parts of the present invention could produce wild fluctuations in the derailleur operation upon suddenly passing the crest of a hill whereby the bicycle chain would quickly undergo a transition from a highly stressed condition to a relatively unstressed condition. Without more, under such circumstances, the automatic shifter spring would operate to quickly pull the movable shifter arm rotatively in a clockwise direction about the fixed arm, thereby causing an unwanted rapid indexing of the derailleur chain shifting sprocket in a direction from a larger cluster gear towards smaller cluster gear.

In order to prevent such wild, uncontrolled movements, a hydraulic cylinder or other deterrent or stabilizing device has been provided and is connected intermediate the movable shifter arm and the fixed arm to control and smooth out the operation of the automatic shifter spring. The hydraulic flow within the cylinder has been designed to permit substantially unrestricted counter-clockwise rotation of the movable shifter arm while torque is being applied to the bicycle chain and to considerably restrict the movable shifter arm rotation in a clockwise direction when the torque is removed from the bicycle chain. By retarding the clockwise speed of rotation of the movable shifter arm when slack in the chain is sensed by the follower, indexing of the derailleur to move the chain from the larger of the cluster gears toward the smaller of the cluster gears will be slowed to a deliberate, steady, controlled speed. The retarding device also serves to stabilize the operation of the automatic shifter throughout the normal rotative motions of the pedals wherein the inherent operating qualities of a bicycle will result in a cyclical rather than in a steady application of torque upon the chain as the bicycle is being propelled. A novel slider or chain follower has been designed to substantially eliminate wear upon the chain contacting component and to prevent unwanted disassociation of the chain follower from the chain.

It is therefore an object of the present invention to provide an improved derailleur shifter for a bicycle transmission of the multi-speed type.

It is another object of the present invention to provide a novel derailleur shifter for a bicycle transmission which comprises a fixed frame connected arm, a shifter arm movable relative to the fixed arm, the movable shifter arm carrying a chain follower in sliding engagement with the bicycle chain, a spring biasing between the two arms to urge the follower to depress the chain and a cable interconnected between the movable shifter arm and the derailleur to automatically shift the derailleur in response to changes in chain tension as sensed by the follower.

It is another object of the present invention to provide an novel automatic derailleur shifter for a bicycle transmission including slider means to sense tension forces in the bicycle chain, movable arm means carrying the slider means and being pivotally movable in response to changes in chain tension forces as sensed by the slider means, cable means between the movable arm means and the derailleur to move the derailleur when the movable arm means is pivotally moved, spring means to normally bias the slider means against the chain and stabilizing means to retard movement of the movable arm means in a clockwise direction when urging the slider means towards the bicycle chain.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 1 is a partial side elevational view of an improved derailleur shifter for a bicycle transmission in accordance with the present invention, showing the upper run of the bicycle chain in a relatively unstressed, depressed condition.

FIG. 2 is an enlarged, perspective view of the improved automatic derailleur shifter.

FIG. 3 is an exploded perspective view of the improved chain follower of the present invention.

FIG. 4 is an enlarged perspective view of chain follower or slider.

FIG. 5 is an enlarged, side elevational view of the slider in operating position in contact with the bicycle chain.

FIG. 6 is a cross sectional view taken along line 6—6 in FIG. 5, looking in the direction of the arrows.

DESCRIPTION OF THE PREFERRED EMBODIMENT OF THE INVENTION

Referring now to the drawings, there is illustrated in FIG. 1 a portion of a bicycle 10 which comprises generally a frame 38 and a bicycle chain 14 which is rotatively driven by one or more large drive gears in well known manner. Equal right and left pedals are arranged to supply rotative energy to the large drive gears for chain rotative purposes in conventional manner.

In well known manner, a plurality of small cluster gears 22, 24, 26, 28, 30 are rotatively carried on the rear bicycle axle 34 for selective engagement by the bicycle chain 14 as controlled by the indexing function of a usual derailleur 32, which derailleur is conventionally secured adjacent to the rear axle 34 in usual manner.

Still referring to FIG. 1 and additionally considering FIG. 2, the improved derailleur shifter 12 of the present invention comprises generally a stationary, frame connected arm 42, which arm is intended to be fixedly secured to the frame 38 of the bicycle 10. As illustrated, the fixed arm 42 comprises an elongated bent clamp 46 for convenient connection upon a forwardly positioned strut of the bicycle frame 38. The frame connected arm 42 terminates forwardly in a forward bent clamp 48 of dimensions suitable to overfit and secure upon a spaced portion of the bicycle frame 38. The bent clamp 46, 48 are pivotal about the arm control body 62 through respective pivot pins 64, 66. The frame connected arm 42 may be easily secured to the bicycle frame 38 simply by tightening the set screws 36, 37 in the usual manner. For optimum orientation of the improved derailleur shifter 12, the rearward bent clamp 46 is fabricated longer than the forward bent clamp 48. This arrangement carries the chain slider or follower to be more forwardly positioned along the chain 14 to facilitate operation of the device with the large transmission gears (not shown).

Still referring to FIGS. 1 and 2, a movable shifter arm 44 is preferably fabricated of strong, planar, relatively lightweight material such as sheet steel or aluminum and is pivotably interconnected with the frame connected arm 42 through an affixed pivot pin 50 to facilitate clockwise and counter-clockwise rotation of the movable shifter arm 44 relative to the frame connected arm 42.

The movable shifter arm 44 forwardly carries a follower shaft 60 upon which a chain slider or follower 58 is freely mounted in a manner to permit both rotary movement about the shaft and angular cocking relative to the axis of the shaft. The limited angular movement of the chain slider 58 relative to the roller shaft 60 responsive to the chain indexing operation of the derailleur 32 in the manner hereinafter more fully described. Preferably, the chain contacting blade portion 68 of the chain follower 58 is fabricated of a curvalineur shaped piece of hardened steel sheet provide long use without slider or chain wear. As illustrated in FIG. 1, the chain slider or follower 58 is positioned to normally bias downwardly against the upper run of the endless bicycle chain 14 for torque sensing purposes in the manner hereinafter more fully explained.

Referring now to FIGS. 3, 4, 5 and 6, the chain slider or follower 58 comprises the hardened steel blade portion 68 which is sandwiched between a pair of keeper side pieces 150, 152. Suitable fasteners 154, 156 insert through respective left and right aligned openings 158, 160, 162 to secure the parts together into a working assembly. The central blade portion 68 comprises an arcuate, chain contacting, bottom surface 170 of suitable thickness and curvature to contact only the central portions of the chain rollers and not the chain links during operation. In this manner, due to the rolling contact between the follower 58 and the chain 14, any tendency to wear will be minimized.

The follower side keepers 150, 152 and the blade portion 68 are provided with transversely aligned openings 164, 166, 168 to receive therethrough in operating engagement the follower shaft 60. As best seen in FIG. 6, the openings 164, 166 are trapezoidal in cross sectional configuration to facilitate angular movement of the chain follower 58 relative to the axis of the chain 14 as the derailleur 32 functions to index the chain 14 across the cluster gears 22, 24, 26, 28, 30. Each side keeper 150, 152 is web shaped in cross sectional configuration and terminates upwardly in a bearing leg 172 of suitable strength to bear against and secure the blade portion 63 therebetween. Each side keeper 150, 152 terminates downwardly in an inwardly facing retaining leg 174 which legs define a chain receiving slot 178 therebetween to permit the slider to be applied over the chain 14. The slider side keepers 150, 152 define a chain receiving space 176 to movably secure the chain in a manner to prevent separation of the slider 58 from the chain 14 during all periods of use.

A coil spring (not shown) could be positioned about the pivot pin 50 to bias the movable shifter arm 44 relative to the fixed arm 42. The geometry of the system is such that the spring continuously biases the movable shifter arm 44 about the pivot pin 50 in a clockwise direction to thereby normally urge the chain slider or follower 58 into engagement with the upper run of the bicycle chain 14. When the chain 14 is relatively unstressed, for example when the bicycle is traveling either along a horizontal plane or on a downhill incline, the spring functions to urge the follower 58 downwardly against the upper run of the chain 14 to thereby depress the chain and take up any slack in the system. See FIG. 1.

When the bicycle 10 is being pedalled uphill so that the rider (not illustrated) has to apply more energy at the bicycle pedals 18, 20, the added torque will be applied directly upon the chain 14 for bicycle propelling purposes and any slack in the upper run of the chain will be removed due to the additional applied torque in the system. This will result in a tendency to straighten the upper run of the chain to approach linearity as additional torque is applied at the pedals 18, 20. As the applied torque causes the upper chain run to approach linearity, this will function to raise the chain follower 58 against the bias of the spring. When the chain follower 58 is thus raised by the applied torque on the chain, it will simultaneously cause a counter-clockwise rotation of the follower affixed movable shifter arm 44 about the frame affixed stationary arm 42.

Referring still to FIGS. 1 and 2, a stabilizing means or cylinder 88 is set forth. In the illustrated embodiment, the stabilizing means 88 is shown as a hydraulic cylinder. However, the invention is not limited to such a construction and other stabilizing means which can be designed to inhibit clockwise rotation of the movable shifter arm 44 relative to the bicycle frame 38 could be employed with equal success. In one embodiment, the hydraulic cylinder 88 comprises a generally hollow cylindrical body 116 which body terminates downwardly in a fixed, bent lower connector 92 having an end which is received through an opening provided in the frame connected arm 42 whereby the lower end of the cylinder 88 can be secured to the frame connected arm 42 in sturdy manner by employing suitable known fasteners.

The upper end of the hollow body 116 is closed with a cap 118 through which a piston rod 120 is reciprocally movable. The piston rod 120 terminates upwardly in a bent upper connector 90 which is affixed to the movable shifter arm by employing conventional fasteners. The cylinder 88 is interconnected between the movable shifter arm 44 and the fixed frame connected arm 42 to act as a deterrent to clockwise rotation of the movable shifter arm.

Referring now to FIG. 1, a conventional derailleur 32 is affixed to the bicycle frame 38 adjacent to the rear axle 34 in well known manner, for example by employing a threaded fastener 180 in conventional manner. The derailleur 32 is constructed in accordance with well known derailleur construction principles and includes generally a pivoting parallelogram linkage to which is conventionally, relatively pivotally arranged, a chain guide 182. The chain guide 182 rotatively supports the upper and lower chain contacting sprockets 142, 144 for chain shifting and chain takeup purposes in manner well known to those skilled in the art. The derailleur 32 is entirely conventional in construction and forms no part of the present invention. Rather, the improved automatic shifter 12 of the present invention is intended to operate with substantially all popular, existing derailleurs 32 and to provide an automatically operating substitution for the previous control cable and hand operating lever (both not shown) which were formerly utilized to manually function the derailleur to shift the chain across the plurality of cluster gears or driven sprockets 22, 24, 26, 28, 30.

As illustrated, a control cable 74 within a usual cable sheath 78 is interconnected between the movable shifter arm 44 and the derailleur 32 to cause indexing, transverse movement of the derailleur in an automatic manner upon rotative movement of the movable shifter arm 44 relative to the fixed arm 42.

Upon removal of the existing derailleur control cable (not illustrated), one end 77 of the flexible control cable 74 can be secured to the derailleur 32 at the existing cable terminal 79 construction by employing the existing terminal connector. Thus, upon axial movement of the flexible cable 74, as controlled by pivotal movement of the shifter arm 44, the existing derailleur 32 will be caused to function in its conventional expected manner. The other end of the cable sheath 78 can be conventionally secured to the sheath connector block 82 which is affixed to the frame connected arm in stationary manner. As shown, a sheath spring 80 is interposed intermediate the ends of the sheath 78 in spaced relation to the connector block 82 to accommodate length variations between the sheath 78 and the control cable 74 as the derailleur 32 is transversely urged across the plurality of cluster gears. The spaced location of the spring 80 from the sheath connector block eliminates any tendency for crimping the control sheath cable due to sharp bends about the connector 82 as sometimes occurred in previous designs.

The end of the control cable 74 adjacent to the automatic shifter 12 can be provided with a conventional cable terminal or loop, which terminal is suitably engaged upon the chain slider shaft 60 in spaced relationship to the sheath connector block 82. It will thus be seen that when the movable shifter arm 44 is caused to rotate relative to the fixed frame connected arm 42 about the pivot pin 50 in response to changes in chain tension as sensed by the chain slider or follower 58, the rotative movement of the movable shifter arm 44 thus caused will result in axial movement of the affixed control cable 74 to thereby render the transverse derailleur movement directly responsive to rotative movement of the movable shifter arm 44.

In a preferred construction, the movable shifter arm 44 is positioned with a forward adjusting edge or cam surface 102 which is provided immediately rearwardly of the follower 58. A strength adjusting piston having a knurled, adjusting knob 104 positioned at the rearward end thereof is reciprocal within the stationary barrel 106 which is affixed to the frame connected arm 42 at the pivot pin 50.

By threadedly turning the adjusting knob 104 relative to the barrel 106, an internal coil spring can be compressed to impose increased spring bias against the adjusting piston and thereby increasingly urge the piston into frictional engagement with the cam surface 102 of the movable shifter arm 44. By either increasing or decreasing the bias of the internal spring, the frictional engagement of the adjusting piston against the cam surface 102 can be varied to thereby increase or decrease the ease of rotation of the movable shifter arm 44 relative to the fixed frame connected arm 42 about the pivot pin 50. In this manner, the automatic shifter 12 can be fine-tuned as necessary to compensate for the individual characteristics and preferances of the rider, such as strength, weight, individual feel, etc.

When the bicycle chain 14 is relatively unstressed, the operating spring will normally cause clockwise rotation of the movable shifter arm 44 about the pivot 50 to urge the chain follower 58 against the chain 14, thereby depressing the upper run of the chain in the manner illustrated in FIG. 1. Such clockwise rotation of the movable shifter arm 44 causes simultaneous axial movement of the control cable 74 in a direction toward the derailleur 32 to thereby allow the derailleur to shift toward the right to move the bicycle transmission to its maximum speed position by tending to align the derailleur upper sprocket 142 with the smallest cluster gear 22. This alignment provides the maximum gear ratio and highest speed for substantially level or downwardly inclined road conditions.

Upon reaching upwardly inclined terrain wherein the cyclist will be required to apply additional forces upon the pedals 18, 20, the chain 14 will be additionally stressed, thereby causing the upper run of the chain to tend to approach linearity. Under such stressed conditions, the chain slider or follower 58 will be urged to rotate the movable shifter arm 44 about the pivot 50 in a counter-clockwise direction. This counter-clockwise rotation of the movable shifter arm 44 will axially pull the control cable 74 and thereby function the derailleur 32 to cause the chain 14 to index transversely across the cluster gears 22, 24, 26, 28, 30. Increased derailleur deflection will cause the derailleur upper sprocket 142 to tend to align with the largest gear 30 of the plurality of cluster gears to thus provide the maximum mechanical advantage provided by the bicycle gearing system.

Without more, should the torque applied upon the bicycle chain 14 be removed, for example when reaching the crest of a hill, the operating spring would immediately function to pull the movable shifter arm 44 in a clockwise direction about its pivot 50. This movement would cause a considerable shock and clattering in the transmission because such a sudden application of the spring forces would result in rapid transverse movement of the derailleur upper sprocket 142 from alignment with the largest cluster gear 30 toward alignment with the smallest cluster gear 22 in an uncontrolled manner.

In order to prevent such wild and uncontrolled movements of the derailleur, the stabilizing or deterrent means 88 has been provided to restrain the speed of rotation of the movable shifter arm 44 in a clockwise direction about the pivot 50.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. In an improved automatic shifter for a derailleur attached to a frame of a bicycle having a large drive gear, an endless drive chain, a rear axile and a cluster of driven gears of the type having a pivot arm means secured to the frame in spaced relation from the derailleur, a shifter arm means pivotally secured to the pivot arm means to move relative to the frame, a biasing means interconnected between the pivot arm means and the shifter arm means to continuously urge the shifter means pivotally about the pivot arm means, a stabilizing means interconnected between the pivot arm means and the shifter arm means to retard the bias of the biasing means, and a cable means interconnecting a portion of the shifter arm means and the derailleur to move the derailleur to index the chain across the cluster of driven gears in response to pivotal movement of the shifter arm means, the improvement comprising a chain slider attached to the shifter arm means, the chain slider comprising a blade having a contacting surface, the contacting surface of the blade being continuously biased against the said endless drive chain.

2. The improved derailleur shifter of claim 1 wherein the chain slider contacting surface is non-linear.

3. The improved derailleur shifter of claim 1 wherein the contacting surface of the chain slider is arcuate.

4. The improved derailleur shifter of claim 1 wherein the chain slider comprises side keepers secured on either side of the blade portion.

5. The improved derailleur shifter of claim 4 wherein the side keepers extend in length below the said contacting surface.

6. The improved derailleur shifter of claim 5 wherein the side keepers comprise vertical webs and bottom retaining legs, the retaining legs and the side keeper webs defining a chain receiving space therebetween.

7. The improved derailleur shifter of claim 6 wherein the retaining legs of the side keepers do not contact each other.

8. The improved derailleur shifter of claim 6 wherein the retaining legs of the side keepers are spaced apart and define therebetween a chain slot.

9. The improved derailleur shifter of claim 8 wherein the chain slot is less in width than the width of the chain.

10. The improved derailleur shifter of claim 4 wherein the side keepers terminate upwardly in bearing legs, the bearing legs respectively contacting and sandwiching the blade portion therebetween.

11. The improved derailleur shifter of claim 10 and a transverse opening provided through the blade portion and the contacting portions of the side keeper bearing legs.

12. The improved derailleur shifter of claim 11 wherein the opening is non-cylindrical in configuration.

13. The improved derailleur shifter of claim 11 wherein the cross sectional configuration of the opening through each bearing leg is trapezoidal.

14. The improved derailleur shifter of claim 1 wherein the cable means comprises a wire cable and a sheath surrounding the cable and wherein a sheath spring is positioned over the cable and in contact with the sheath to permit limited axial movement of the sheath relative to the cable.

15. The improved derailleur shifter of claim 14 wherein the sheath is divided into portions and the sheath spring is positioned intermediate the divided sheath portions.

16. The improved derailleur shifter of claim 15 wherein the sheath spring is positioned in spaced relationship from the interconnection between the cable means and the shifter arm means.

* * * * *